(12) United States Patent
Borander

(10) Patent No.: US 8,757,201 B2
(45) Date of Patent: Jun. 24, 2014

(54) AIR FLOW ADJUSTMENT

(75) Inventor: Jerry Borander, Bankeryd (SE)

(73) Assignee: Jerry Borander, Bankeryd (SE)

( * ) Notice: Subject to any disclaimer, the term of this patent is extended or adjusted under 35 U.S.C. 154(b) by 279 days.

(21) Appl. No.: 12/998,101

(22) PCT Filed: Sep. 30, 2009

(86) PCT No.: PCT/SE2009/051089
§ 371 (c)(1),
(2), (4) Date: Apr. 5, 2011

(87) PCT Pub. No.: WO2010/039100
PCT Pub. Date: Apr. 8, 2010

(65) Prior Publication Data
US 2011/0186156 A1 Aug. 4, 2011

(30) Foreign Application Priority Data

Sep. 30, 2008 (SE) .................................... 0802050
Oct. 13, 2008 (SE) .................................... 0802178
Apr. 15, 2009 (SE) .................................... 0900496

(51) Int. Cl.
*F16K 37/00* (2006.01)
*F16K 7/08* (2006.01)

(52) U.S. Cl.
USPC ............................. 137/553; 251/4; 251/248

(58) Field of Classification Search
USPC .......... 251/249.5, 341, 342, 343, 346, 4, 215, 251/248, 251, 252, 212, 340; 137/553, 556
See application file for complete search history.

(56) References Cited

U.S. PATENT DOCUMENTS

| 1,986,484 | A | * | 1/1935 | Schlueter ........................... 251/4 |
| 2,657,004 | A | * | 10/1953 | Lovington ........................ 251/4 |
| 3,002,529 | A | * | 10/1961 | Bowman ........................ 137/553 |
| 3,190,305 | A | * | 6/1965 | Schulze ......................... 137/255 |
| 3,319,925 | A | * | 5/1967 | Kojima et al. ................... 251/58 |
| 3,329,390 | A | * | 7/1967 | Hulsey .............................. 251/4 |

(Continued)

FOREIGN PATENT DOCUMENTS

| DE | 102006053208 A1 | 5/2008 |
| GB | 363365 A | 12/1931 |

(Continued)

OTHER PUBLICATIONS

Aug. 30, 2013 European Search Report issued in EP 09818069.8.

*Primary Examiner* — John Rivell
(74) *Attorney, Agent, or Firm* — Harness, Dickey & Pierce, PLC

(57) ABSTRACT

A device for airflow regulation in an air damper is disclosed. The device includes a twist sleeve of flexible material, the cross section of which substantially conforms to an outer tube in which the flow takes place, one end of the twist sleeve being disposed on the inner side of the outer tube and the other end of the twist sleeve being disposed in a tube sleeve which can be rotated under an axial displacement controlled in relation to the rotation. The outer diameter of the tube sleeve is smaller than the inner diameter of the outer tube, so that the tube sleeve slides easily in the outer tube. The tube sleeve is provided with a helical slot. The rotation of the tube sleeve is achieved by a gearwheel adapted to cooperate with the helical slot to pull around the tube sleeve.

8 Claims, 4 Drawing Sheets

(56) References Cited

U.S. PATENT DOCUMENTS

| | | | | |
|---|---|---|---|---|
| 4,292,969 A | * | 10/1981 | Raible et al. | 251/4 |
| 4,523,737 A | | 6/1985 | Wentworth | |
| 5,549,793 A | * | 8/1996 | Hellstrom et al. | 251/4 |
| 6,536,739 B1 | * | 3/2003 | Jensen | 251/6 |
| 2005/0092944 A1 | * | 5/2005 | Patterson | 251/4 |

FOREIGN PATENT DOCUMENTS

| | | |
|---|---|---|
| JP | S4972031 | 6/1974 |
| JP | S58206412 | 12/1983 |
| JP | S62192150 | 12/1987 |
| WO | WO-2004023047 A1 | 3/2004 |

* cited by examiner

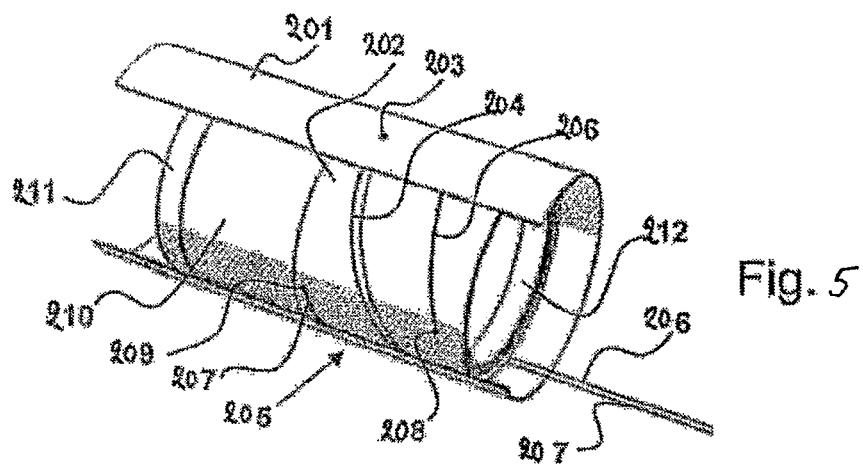
Fig. 5
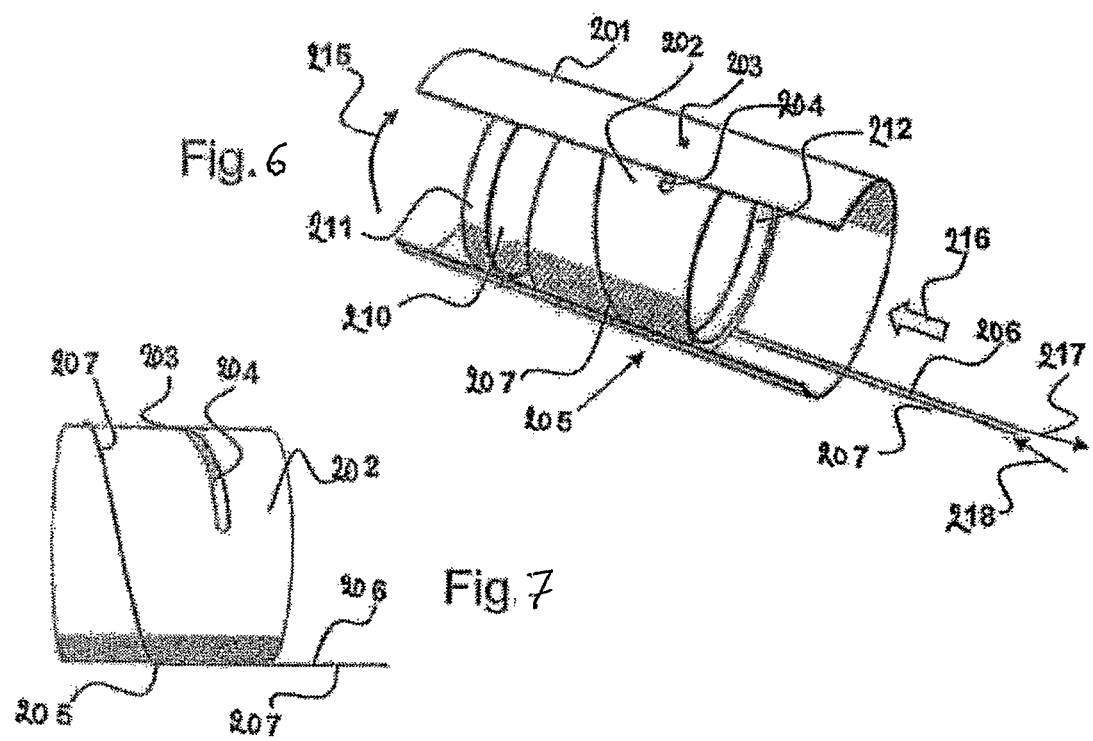
Fig. 6
Fig. 7
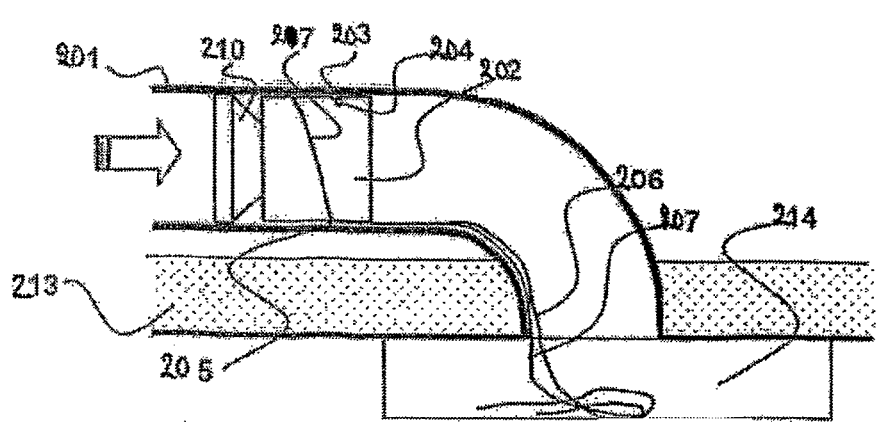
Fig 8

AIR FLOW ADJUSTMENT

TECHNICAL FIELD

The present invention relates to a device for, from the outer side of an air duct, achieving regulation of the airflow in an air damper, comprising a twist sleeve of flexible material, the cross section of which substantially conforms to the duct in which the flow takes place, one end of the twist sleeve being disposed arranged in relation to the duct and the other end being arranged in relation to a tube sleeve which can be rotated under an axial displacement controlled in relation to the rotation.

BACKGROUND

Various devices for transmitting motions, both in the axial direction and in the direction of rotation, between an outer tube and an inner tube are previously known. The majority are realized as a thread between the tubes, either the outer tube or the inner tube being used to achieve the rotation. These devices are often used in table legs, white goods and other applications in which there is a need to make a height adjustment and effect levelling against the floor. This works well when dealing with small tube dimensions. Where larger dimensions are involved, it creates problems. A type of "drawer effect" is then obtained, which increases the greater the dimensions of the tubes. There are an endless number of devices for converting a rotary motion into a linear motion. Likewise, there are an endless number of devices for converting a linear motion into a rotary motion. These are not made to achieve simultaneous linear and rotary transmission. Air dampers comprising a twist sleeve of flexible material, the cross section of which substantially conforms to the duct in which the flow takes place, are previously known. One end of the twist sleeve is fixed in relation to the duct and the other end can be rotated, whereupon the free area in the centre decreases in relation to the original state.

There are some known solutions for rotating the twist sleeve, but when it is a matter of, from the outer side of an outer tube, achieving an axial and, at the same time, rotary motion of the twist sleeve, there is currently no solution for this. The motion should also be able to be indicated for fine adjustment. Likewise, no flow in the outer tube must leak out. It is especially difficult to achieve this when larger tube diameters are involved.

In addition, there are some known solutions for rotating the twist sleeve from the outer side of the outer tube with cords. There are also known solutions for rotating damper valves with cords from the inner side of an outer tube. But where it is a matter of achieving in an outer tube an axial and, at the same time, rotary motion of the twist sleeve with cords from the outside, there is currently no solution for this.

SUMMARY OF THE INVENTION

It is therefore an object of the present invention to provide an improved device for, preferably from the outside but also from the inside, achieving rotation under an axial displacement of a twist sleeve, which displacement is controlled in relation to the rotation. One end of the twist sleeve is arranged in relation to the outer tube of the duct and the other end is arranged in relation to a tube sleeve. The outer diameter of the tube sleeve is only somewhat smaller than the inner diameter of the outer tube, so that the tube sleeve slides easily in the outer tube. The tube sleeve has a helical slot in its shell surface. According to the invention, the rotation can be achieved in a variety of ways with the aid of some foam of operating apparatus, which can be variously configured, e.g. with the aid of an operating spindle which cooperates with the slot. The rotation can be realized with the aid of two cords from the inner side of the outer tube. The rotation can be realized by, from the outer side of the outer tube, rotating a cord reel in cooperation with cords in such a way that the cords pull round the tube sleeve.

The first embodiment of the invention comprises an improved device, which allows a rotation to be achieved from the outside under an axial displacement of a twist sleeve, which displacement is controlled in relation to the rotation. Control dampers of the type which are to be regulated by the device are used to regulate the airflow in air treatment installations and ventilation systems by causing a fall in pressure and in order to control the airflow to individual spaces and in relation to other spaces within the zone of the same ventilation system. In order to attain this, control dampers are installed at a number of different locations within a system.

One end of the twist sleeve is fixed in relation to the outer tube of the duct and the other end is fixed to a tube sleeve. The rotation is made, preferably through 180 degrees, to and fro, at the same time as the tube sleeve moves axially to and fro. The outer diameter of the tube sleeve is only somewhat smaller than the inner diameter of the outer tube, the tube sleeve being able to slide easily in the outer tube. The tube sleeve has a helical slot in its shell surface. The slot can be configured, for example, with teeth along one edge. From the outside and through a hole, at right angles to the outer tube, an operating spindle is seated, so that its lower part, configured as a gearwheel, goes down into the slot in the tube sleeve. When the operating spindle is rotated, the gearwheel pulls round the tube sleeve, which at the same time moves axially, whereupon the twist sleeve moves in accompaniment and its free area in the centre decreases in relation to the original state.

Between the outer tube and the tube sleeve and in the slot in the tube sleeve there is a runner which slides in the slot. The lower part of the operating spindle passes through the runner, which guides the gearwheel of the operating spindle in correct position towards the slot in the tube sleeve. The top of the operating spindle is arranged such that it can be rotated manually or with a motor. When the operating spindle is rotated, the gearwheel pulls round the tube sleeve in a controlled axial displacement. A simple construction is hereby attained, which, with a low torque upon the operating spindle, moves the tube sleeve. The operating spindle seals the outer tube, so that no fluid can leak out. The operating spindle is provided with a worm screw which actuates a display wheel. On the display wheel, the position of the tube sleeve can be read, so that the flow in the duct can be finely adjusted. The operating spindle and the display wheel are enclosed in an operating hood fixed against the outer tube. In the upper part of the operating hood there is a window for reading of the display wheel. The operating spindle is mounted in the outer tube and in the top part of the operating hood.

The second embodiment of the invention has a device which allows a rotation to be achieved from the inside with two cords under an axial displacement of a twist sleeve, which displacement is controlled in relation to the rotation. A control damper of the type which shall be regulated by the device is used to regulate the airflow in air treatment installations and ventilation systems by causing a fall in pressure and in order to guide the airflow to individual spaces and in relation to other spaces within the zone of the same ventilation system.

One end of the twist sleeve is fixed in relation to the outer tube of the duct and the other end is fixed to a tube sleeve. The rotation is effected with two cords, preferably through 180 degrees, to and fro, at the same time as the tube sleeve moves axially to and fro. The outer diameter of the tube sleeve is only somewhat smaller than the inner diameter of the outer tube, the tube sleeve sliding easily in the outer tube. There is also space for the cords between the outer tube and the tube sleeve. The tube sleeve has a helical slot in its shell surface. In the outer tube there is a guide pin, which goes down into the slot in the tube sleeve. The guide pin holds the tube sleeve in place and guides the tube sleeve in the axial direction when it is rotated. Between the tube sleeve and the outer tube, on the inner side of the outer tube and directly in front of the tube sleeve, sits an eye, through which the two cords run. The cords are accommodated between the outer tube and the tube sleeve. The cords change direction in the eye, so that they, on the one hand, follow the outer tube in the axial direction and, on the other hand, are angled to run round the tube sleeve on either side. In the outer tube sits a guide pin, which goes down into the slot in the tube sleeve. The cords pull round the tube sleeve, which at the same time moves axially, the central, free area of the twist sleeve decreasing or increasing in relation to the original state. A simple construction is hereby attained, which, with a small force upon the cords, moves the tube sleeve. The cords are marked such that it is known which cord has to be pulled on for opening or shutting of the control damper. The cords are pulled up to an air handling unit, beneath which they are protected against unauthorized influencing of the adjustment of the control damper.

The third embodiment of the invention has a device which allows a rotation to be achieved from the outer side of an outer tube under an axial displacement of a twist sleeve, which displacement is controlled in relation to the rotation, inside the outer tube with the aid of two cords. A control damper of the type which shall be regulated by the device is used to regulate the airflow in air treatment installations and ventilation systems by causing a fall in pressure and in order to guide the airflow to individual spaces and in relation to other spaces within the zone of the same ventilation system.

One end of the twist sleeve is fixed in relation to the outer tube of the duct and the other end is fixed to a tube sleeve. The rotation is realized with two cords, preferably through 180 degrees, to and fro, at the same time as the tube sleeve moves axially to and fro. The outer diameter of the tube sleeve is only somewhat smaller than the inner diameter of the outer tube, the tube sleeve sliding easily in the outer tube. There is also space for the cords between the outer tube and the tube sleeve. The tube sleeve has a helical slot in its shell surface. In the outer tube there is a guide pin, which goes down into the slot in the tube sleeve. The guide pin holds the tube sleeve in place and guides the tube sleeve in the axial direction when it is rotated. On the inner side of the outer tube and at the bottom edge of the tube sleeve two cords are attached, which run on either side between the twist tube and the outer tube. The cords run out through the outer tube via a slide sleeve fixed against the outer tube, whereafter they on the outside change direction in the longitudinal direction of the outer tube, where they are wound onto a cord reel. When the cord reel is rotated round, the cords pull round the tube sleeve, which also at the same time moves axially, whereupon the central, free area of the twist sleeve decreases in relation to the original state. A simple construction is hereby attained, which, with a small force upon the cords, moves the tube sleeve.

BRIEF DESCRIPTION OF THE DRAWINGS

A number of embodiments of the invention are described below and are illustrated in the appended drawings, in which:

FIG. 5 shows a slit-open view of the control damper for full flow, FIG. 6 shows a slit-open view of the control damper in respect of restricted flow, FIG. 7 shows a view of the tube sleeve and how the cords are arranged, FIG. 8 shows a diagram of a control damper installed in an air duct.

DESCRIPTION OF PREFERRED EMBODIMENTS

Three different embodiments of the present invention will be described below with reference to the figures.

According to a first embodiment of the invention, an airflow regulating device according to FIGS. 1, 2, 3 and 4 is shown and this can represent the structural form which is applied in the example referred to here.

Figure 1:
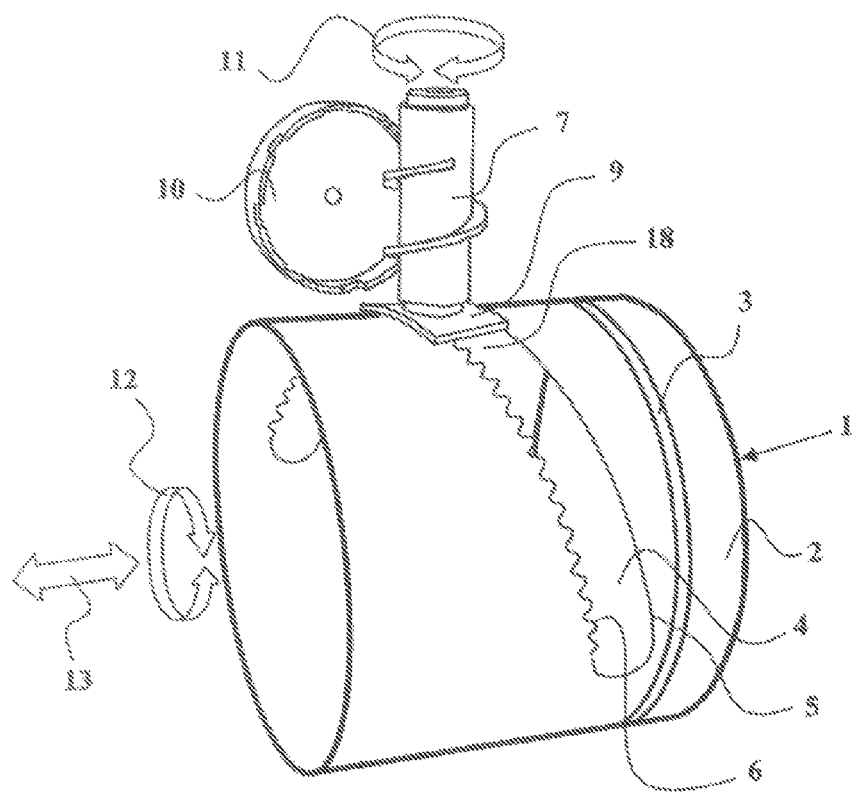
FIG. 1, shows a view of a tube sleeve and how the rotation is achieved.

The airflow regulating device according to FIG. 1 shows a view of a tube sleeve 1 and how the rotation 12 is achieved. The tube sleeve 1 has at its one end in the casing 2 an inwardly directed beading 3, which constitutes an edge against which a twist sleeve shall be fixed. The tube sleeve 1 is provided with a helical slot 4. By the word "helical" is here meant that the slot 4 (see also, for example, FIGS. 5 and 9) extends round the shell surface of the tube sleeve 1 in such a way that also an axial displacement takes place from the point where the slot commences to the point where the slot ends.

The helical slot 4 can be variously configured. The slot can have straight edges, see, for example, FIGS. 5 and 9, in which the slot has the reference notation 204 and 302 respectively. The slot can have a straight edge 5 along one side and teeth 6 on the other side, see FIGS. 1 to 4. It is further shown in FIGS. 1 to 4 how rotation of the tube sleeve 1 is achieved by an operating apparatus 7. The operating apparatus 7 can be constituted, for example, by an operating spindle, or can be configured in some other way suitable for the purpose. The operating apparatus 7 is provided with a part 18, which is arranged to cooperate with the slot 4 in such a way that the operating apparatus 7 pulls round the tube sleeve 1, at the same time as the tube sleeve 1 moves axially.

The part 18 can be constituted, for example, by a gearwheel 18, which is disposed in the lower part of the operating spindle 7 and is stuck down through a runner 9, which runs against the edges in the helical slot 4. The operating spindle 7 actuates a display wheel 10, from which the rotation can be read. When the operating spindle 7 is rotated according to the arrow 11, the gearwheel 18 pulls round the tube sleeve 1 according to the arrow 12, at the same time as the tube sleeve 1 moves axially according to the arrow 13.

Instead of a slot 4 with teeth 6 and an operating spindle with gearwheel 18, other suitable solutions are conceivable. For example, a smooth-edged slot can be used and the operating spindle 7 can be provided with a sliding element corresponding to the part 18, which can slide in the slot 4.

Figure 2:
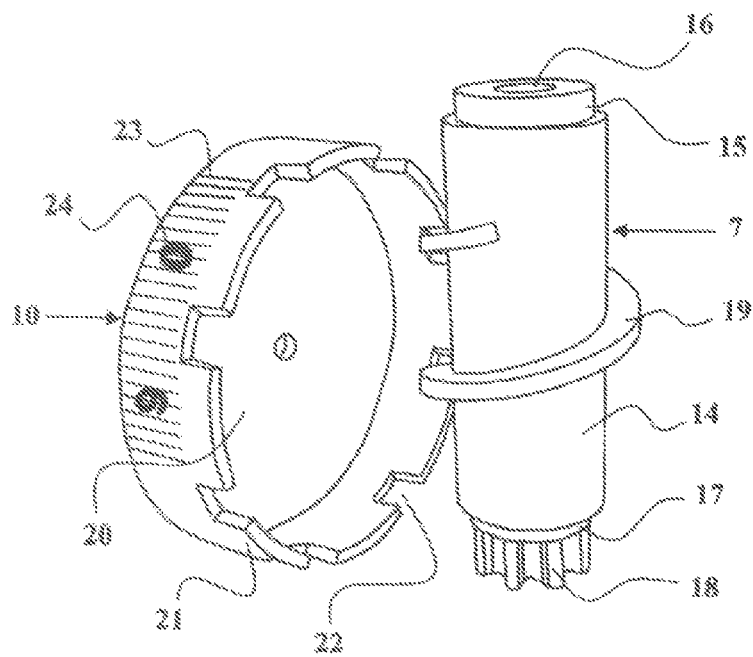
FIG. 2 shows a view of an operating spindle and a display wheel.

The airflow regulating device according to FIG. 2 shows a view of an operating spindle 7 having a body 14, which in its upper part has a mounting spigot 15, as well as a recess 16 fitting a tool or motor for rotation. In the lower part of the body 14, a mounting spigot 17 and a gearwheel 18 are integrated. The body 14 is provided with an external worm screw 19, which actuates a display wheel 10 having a base 20 and a rim 21 with recesses 22 for the worm screw 19. Around the outer side of the display wheel 10 there are a scale 23 and numerals 24 for reading.

Figure 3:
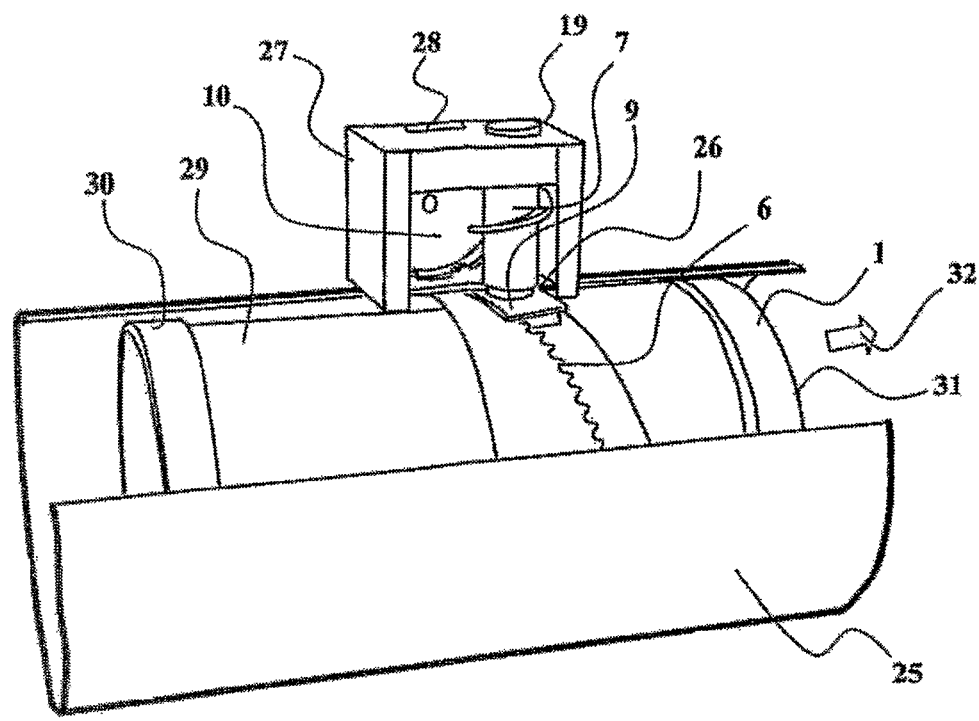
FIG. 3 shows a slit-open view of the operating mechanism for full flow.

The airflow regulating device according to FIG. 3 shows a slit-open view of the operating mechanism in respect of full flow, with outer tube 25 containing the tube sleeve 1, as well as a mounted operating hood 27. On the shell surface of the outer tube 25 there is a hole 26, in which the gearwheel 18 of the operating spindle 7 connects to the teeth 6 of the tube sleeve 1 via the runner 9. The operating spindle 7 and the display wheel 10 are mounted in an operating hood 27, in which the upper spigot 19 of the operating spindle 7 juts up out of the operating hood 27. In addition, the operating hood 27 is provided with a reading window 28 for reading of the display wheel 10. A twist sleeve 29 is at its one end 30 fixedly connected to the outer tube 25 and at its other end 31 fixedly connected to the tube sleeve 1. The figure shows when the flow is regulated to full opening by the twist sleeve 29. The tube sleeve 1 is in this case in its outermost position according to the arrow 32.

Figure 4:
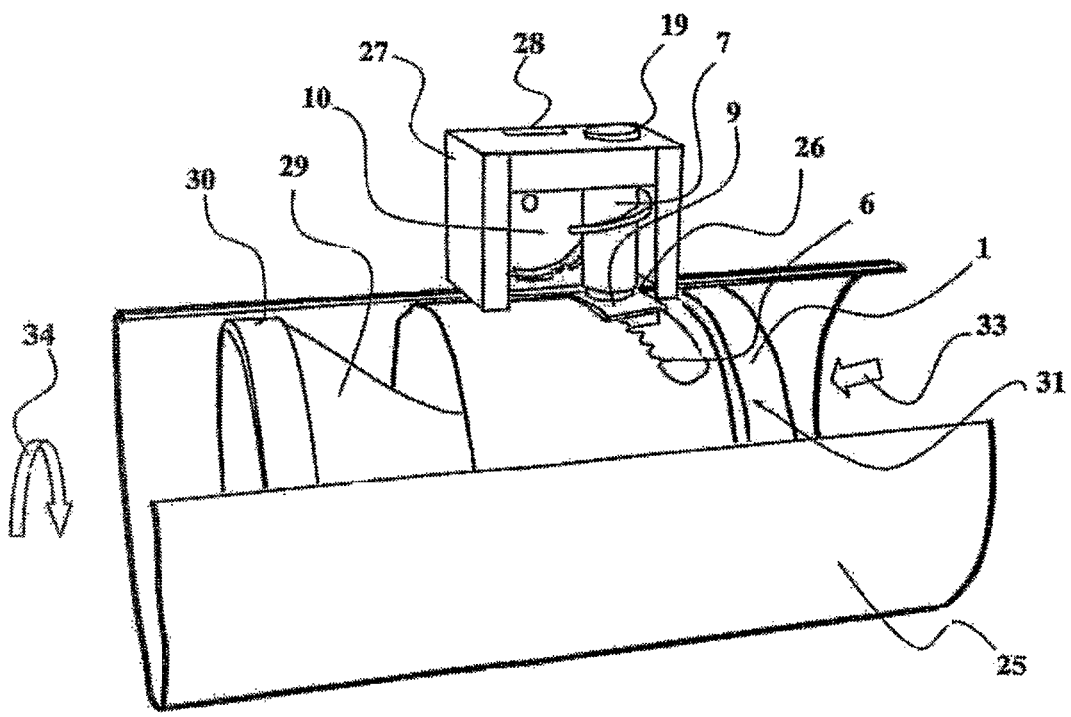
FIG. 4 shows a slit-open view of the operating mechanism in respect of restricted flow.

An airflow regulating device according to FIG. 4 shows a slit-open view of the operating mechanism in respect of restricted flow, an outer tube 25 containing the tube sleeve 1, as well as a mounted operating hood 27. A twist sleeve 29 is at its one end 30 fixedly connected to the outer tube 25 and at its other end 31 fixedly connected to the tube sleeve 1. The figure shows how the flow is restricted in the twist sleeve 29. This is regulated with the operating spindle 7, the tube sleeve 1 being then rotated according to the arrow 34, as well as axially displaced according to the arrow 33.

According to a second embodiment of the invention, an airflow regulating device according to FIGS. 5, 6, 7 and 8 and this can represent the structural form which is applied in the example referred to here.

The airflow regulating device according to FIG. 5 shows a slit-open view of a control damper in respect of full flow. The control damper consists of an outer tube 201 containing a tube sleeve 202 and a twist sleeve 210. One end 211 of the twist sleeve 210 is fixed in relation to the outer tube 201 of the duct and the other end 212 is fixed to the tube sleeve 202. The tube sleeve 202 has a helical slot 204 in its shell surface. In the outer tube 201 there is a guide pin 203, which goes down into the slot 204 in the tube sleeve. The guide pin 203 holds the tube sleeve 202 in place and guides the tube sleeve 202 in the axial direction when this is rotated. Between the tube sleeve 202 and the outer tube 201, on the inner side of the outer tube 201 directly in front of the tube sleeve 202, sits an eye 205, through which run two cords 206, 207. The cords 206, 207 are accommodated between the outer tube 201 and the tube sleeve 202. The cords 206, 207 change direction in the eye 205, so that they, on the one hand, follow the outer tube 201 in the axial direction and, on the other hand, are angled to run round the tube sleeve 202 on either side to more than half the circumference. The cords 206, 207 are provided with fastenings 208, 209 against the tube sleeve 202. The cords 206, 207 pull round the tube sleeve 202, which also at the same time moves axially, whereupon the central, free area of the twist sleeve 210 decreases or increases in relation to the original state. A simple construction is hereby attained, which with a small force upon the cords 206, 207 moves the tube sleeve 202. The cords 206, 207 are marked, so that it is known which cord 206,207 has to be pulled on for opening and closing of the control damper. The cords 206,207 are pulled up to an air handling unit, beneath which they are protected against unauthorized influencing of the adjustment of the control damper. Moreover, visibly hanging cords are avoided.

The airflow regulating device according to FIG. 6 shows a slit-open view of a control damper in respect of restricted flow, an outer tube 201 containing a tube sleeve 202, and a twist sleeve 210. When one cord 206 is pulled on according to the arrow 217, the tube sleeve 202 is rotated round according to the arrow 215, at the same time as the tube sleeve 202 moves in the axial direction according to the arrow 216. This occurs by virtue of the fact that the helical slot 204 guides the tube sleeve 202 via the guide pin 203. The second cord 207 is then pulled in and round the tube sleeve 202 according to the arrow 218. Since one end 212 of the twist sleeve 210 is fixedly secured in the tube sleeve 202, the twist sleeve 210 is also rotated, whereupon the central, free area of the twist sleeve 210 decreases in relation to the original state and the flow is restricted. In order to increase the flow again, the second cord 207 is pulled on, whereupon the process takes place in reverse.

The airflow regulating device according to FIG. 7 shows a view of a tube sleeve 202, which is provided with a helical slot 204 running outside a guide pin 203. The outer diameter of the tube sleeve 202 is only somewhat smaller than the inner diameter of the outer tube 201, so that the tube sleeve 202 can easily slide in the outer tube 201. There is also room for the cords 206, 207 between the outer tube 201 and the tube sleeve 202. The eye 205 is fixedly mounted in the outer tube 201 and on the opposite side of the guide pin 203. The eye 205 is shown orientated in relation to the tube sleeve 202. In addition, it is shown how the cord 207 runs round the tube sleeve 202 in the same helical form as the slot 204. The cord 206 runs round the tube sleeve 202 in the other direction on the opposite side.

The airflow regulating device according to FIG. 8 shows a diagram of a control damper installed in an air duct, which emerges through a vault 213 into an air handling unit 214. The cords 206, 207 are marked, so that it is known which cord 206, 207 has to be pulled on for opening and closing of the control damper. The cords 206, 207 are pulled up to the air handling unit 214, beneath which they are protected against unauthorized influencing of the adjustment of the control damper.

According to a third embodiment of the invention, a device for regulating the airflow in a control damper according to FIGS. 9, 10, 11, 12 and 13 is shown and this can represent the structural form which is applied in the example referred to here.

Figure 9:
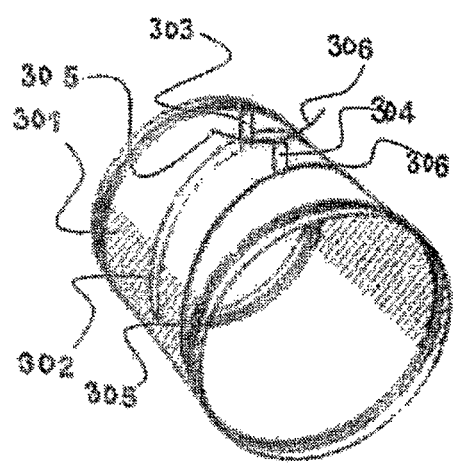
FIG. 9 shows a view of the tube sleeve in the control damper with guide pin, sliding sleeve and fastened cords.

The device for regulating the airflow in a control damper according to FIG. 9 shows a view of the tube sleeve 301 in the control damper with guide pin 303, sliding sleeve 304 and fastened cords 305, 306. The tube sleeve 301 has a helical slot 302 in its shell surface. The cord 305 is fixed and runs on the outer side of the tube sleeve 301 beside the slot 302 and directly below where the slot 302 ends on the tube sleeve 301.

The cord 305 follows the same helical form as the slot 302 in the tube sleeve. The cord 305 is then pulled up through the sliding sleeve 304, where it then, upon exit from the sliding sleeve 304, is angled in the longitudinal direction of the tube sleeve 301. By virtue of a precise fit in the sliding sleeve 304, this seals the cord 305 against air permeation. The same applies to the cord 306 on the opposite side of the tube sleeve 301. When the cord 305 is pulled on, the tube sleeve 301 will rotate about its centre axis, at the same time as it moves in the axial direction. When the opposite cord 306 is then pulled on, the reverse process is obtained.

Figure 10:
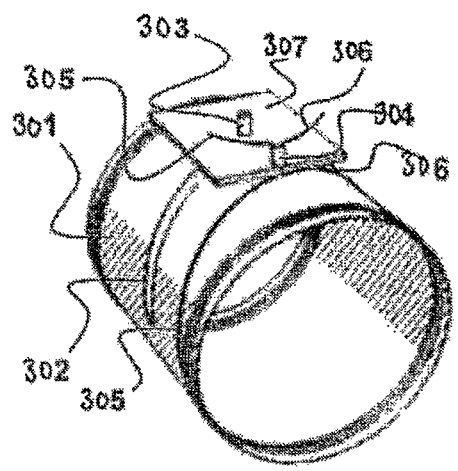
FIG. 10 shows a view of the tube sleeve in the control damper with the guide pin and the sliding sleeve fixedly integrated in a base plate and how this is orientated over the tube sleeve.

The device for regulating the airflow in a control damper according to FIG. 10 shows a view of the tube sleeve 301 in the control damper with the guide pin 303 and the sliding sleeve 304 fixedly integrated in a base plate 307 and how this is orientated over the tube sleeve 301. The guide pin 303 passes through the base plate 307, where it on the underside guides up the tube sleeve 301, so that this is held in place in an outer tube, and also makes the tube sleeve 301 move in the axial direction when this is rotated. The guide pin 303 goes further up out of the base plate 307, where it constitutes a journal for a cord reel. The sliding sleeve 304 is integrated in the base plate 307 in the same way, so that it juts down on the bottom side and up on the top side.

Figure 11:
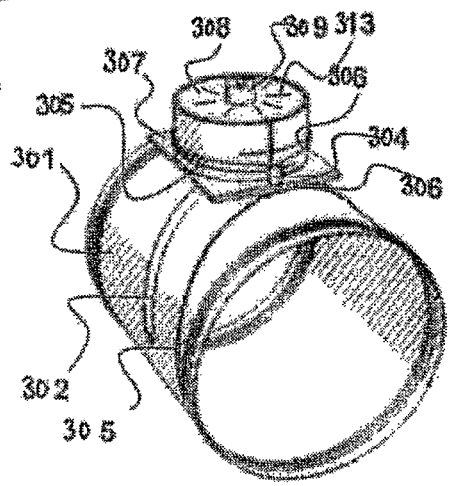
FIG. 11 shows a view of the tube sleeve in the control damper with a cord reel applied to the base plate and how the cords are wound round the cord reel.

The device for regulating the airflow in a control damper according to FIG. 11 shows a view of the tube sleeve 301 in the control damper with a cord reel 308 applied to a base plate 307 and how the cords 305, 306 are wound round the cord reel 308. The cords 305, 306 are wound up from their respective direction with at least one turn of the cord reel 308. The end of the cords 305, 306 is fixed against the cord reel 308. The cords 305, 306 are wound up at a distance apart, so that there is no tangling together. The cord reel 308 is integrated with a journal 309 in its upper part. The cord reel 308 can be rotated by the journal 309 manually or with motor, so that the tube sleeve 301 is made to rotate and move in the axial direction. The cord reel 308 is provided in its upper part with graduations 313 for reading whenever the airflow is to be regulated.

Figure 12:
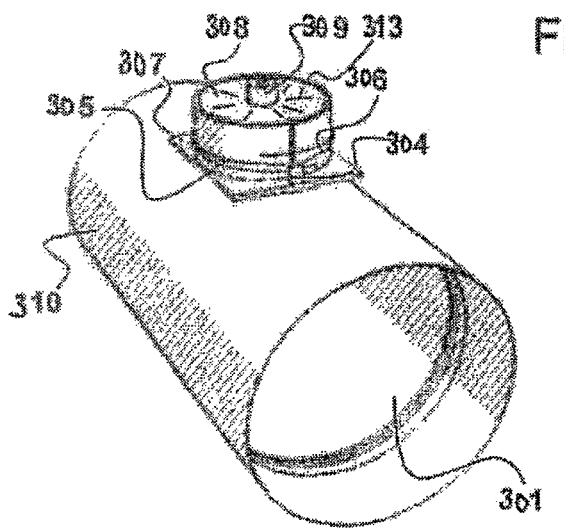
FIG. 12 shows a view of a control damper installed in an air duct and how the base plate is fixed against the outer tube.

The device for regulating the airflow in a control damper according to FIG. 12 shows a view of a control damper 301 installed in an air duct and how the base plate 307 with the cord reel 308 is fixed against the outer tube 310. Drilled in the outer tube 310 are two holes, in which the guide pin 303 and the sliding sleeve 304 are pressed in place with a press fit. The guide pin 303 goes down into the slot 302 in the guide sleeve 301, so that it secures the guide sleeve 301 in the outer tube 310. The lower part of the sliding sleeve 304 juts down between the guide sleeve 301 and the outer tube 310, where a gap is formed, so that the cords 305, 306 are accommodated therebetween.

Figure 13:
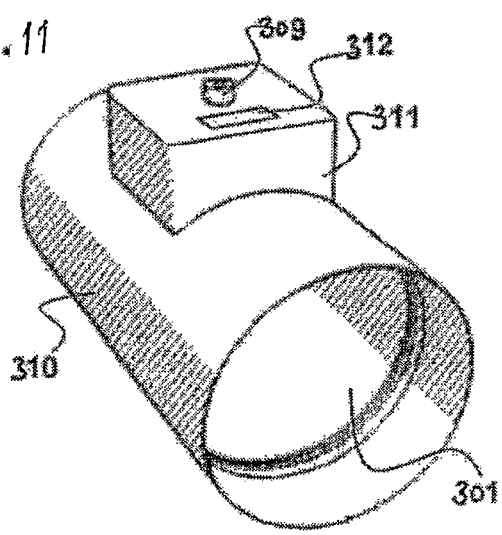
FIG. 13 shows a view of a control damper installed in an air duct and how the base plate with the cord reel is covered by a hood which connects to the outer tube.

The airflow regulating device for regulating the flow in a control damper according to FIG. 13 shows a view of a control damper installed in an air duct and how the base plate with the cord reel is covered by a hood 311 which connects to the outer tube 310. The journal 309 juts up through a hole in the top of the hood 311. The cord reel 308 is provided with graduation 313 for reading in a window 312 on the hood 311 whenever the airflow is to be regulated.

The invention has been described in accordance with a preferred assembly and configuration and it is implicit that certain exchanges and changes can be made without deviating from the spirit of the invention. In the embodiments just described, it is shown how the device is used to achieve regulation of the airflow in a control damper. Further alternative embodiments are nevertheless possible, for example the device can be used to close or open other valves or adjust positions in tubes. Likewise, the device can be used when there is a wish to distribute flows. Likewise, the cords can be provided with graduations for reading during adjustment of the airflow. Instead of cords, narrow ribbons can be used. The invention should therefore not be regarded as limited to that which has been shown and described above, but rather similar variants are incorporated in the inventive concept and can be deemed to fall within the scope of the following claims.

The invention claimed is:

1. Device for regulating the airflow in an air damper, comprising:
a twist sleeve of flexible material, having a cross section which substantially conforms to an outer tube in which the flow takes place, one end of the twist sleeve being disposed on an inner side of the outer tube and an other end of the twist sleeve being disposed in a tube sleeve which is rotatable under an axial displacement controlled in relation to the rotation, an outer diameter of the tube sleeve being somewhat smaller than an inner diameter of the outer tube, so that the tube sleeve slides easily in the outer tube, wherein the tube sleeve is provided with a helical slot with teeth along a first edge, and wherein the rotation of the tube sleeve is achieved by an operating apparatus configured to pull round the tube sleeve, at the same time as the tube sleeve moves axially, and
wherein the operating apparatus includes a gearwheel configured to, when being rotated, cooperate with the teeth in the helical slot to pull around the tube sleeve.

2. The device of claim 1, wherein the helical slot is disposed in a shell surface of the tube sleeve.

3. The device of claim 1, wherein the operating apparatus is provided with an external worm screw, which actuates a display wheel having a bottom and a rim with recesses for the worm screw, and wherein a scale is present around an outer side of the display wheel, as well as numerals for reading.

4. The device of claim 1, wherein between the outer tube and the helical slot in the tube sleeve there is a runner, which slides in the helical slot and in which a lower part of the operating apparatus passes through the runner, which guides the lower part of the operating apparatus in correct position towards the helical slot in the tube sleeve.

5. The device of claim 3, wherein the operating apparatus and the display wheel are mounted in an operating hood, in which an upper spigot of the operating apparatus juts out into the operating hood, which also is provided with a reading window for reading of a value of the display wheel.

6. The device of claim 3, wherein a top of the operating apparatus is arranged such that a connection for manual or motorized rotation can be made.

7. The device of claim 1, wherein the gearwheel is disposed in a lower part of the operating apparatus.

8. The device of claim 1, wherein,
the helical slot includes a second edge,
the gearwheel is stuck through a runner which runs against the first edge and the second edge of the helical slot.

* * * * *